United States Patent
Wojcik

(10) Patent No.: US 6,417,149 B1
(45) Date of Patent: Jul. 9, 2002

(54) PAINT STRIPPING COMPOSITION AND PROCESS CONTAINING METHYL BENZOATE AND FORMIC ACID

(76) Inventor: Gerald Wojcik, 429 Prospect St., Thomaston, CT (US) 06787-1205

( * ) Notice: Subject to any disclaimer, the term of this patent is extended or adjusted under 35 U.S.C. 154(b) by 0 days.

(21) Appl. No.: 09/949,191

(22) Filed: Sep. 7, 2001

Related U.S. Application Data

(63) Continuation-in-part of application No. 09/779,275, filed on Feb. 8, 2001, now abandoned.

(51) Int. Cl.⁷ .............................. C11D 3/20; C11D 7/08; C11D 3/44
(52) U.S. Cl. ................. 510/201; 510/202; 510/203; 510/210; 510/211; 510/405; 510/488; 134/38
(58) Field of Search ................................ 510/201, 202, 510/203, 210, 211, 405, 488; 134/38

(56) References Cited

U.S. PATENT DOCUMENTS

| | | | |
|---|---|---|---|
| 5,011,621 A | * | 4/1991 | Sullivan .................... 252/162 |
| 5,015,410 A | * | 5/1991 | Sullivan .................... 252/166 |
| 5,753,603 A | | 5/1998 | Lallier et al. ............... 510/212 |
| 5,817,612 A | | 10/1998 | Distaso ....................... 510/203 |
| 5,851,972 A | | 12/1998 | Distaso et al. ............. 510/206 |
| 5,990,062 A | | 11/1999 | Summerfield et al. ...... 510/204 |
| 6,001,192 A | | 12/1999 | Lallier et al. ................ 134/38 |
| 6,025,313 A | | 2/2000 | Weir ........................... 510/201 |
| 6,030,466 A | | 2/2000 | Myers, II .................... 134/38 |

* cited by examiner

Primary Examiner—Charles Boyer
(74) Attorney, Agent, or Firm—Carmody & Torrance LLP

(57) ABSTRACT

A paint stripping composition comprising methyl benzoate and formic acid, as well as a method for using the foregoing composition in stripping paint from a substrate, are disclosed. The paint stripping composition may optionally also comprise thickeners, surfactants, and corrosion inhibitors. The composition and method are useful in stripping a variety of paints and similar organic coatings from both metallic and non-metallic substrates. Most preferably, the paint stripping composition does not comprise n-methyl-2-pyrrolidone.

10 Claims, No Drawings

PAINT STRIPPING COMPOSITION AND PROCESS CONTAINING METHYL BENZOATE AND FORMIC ACID

This patent application is a continuation-in-part of U.S. Ser. No. 09/779,275, filed on Feb. 8, 2001 now abandoned.

BACKGROUND OF THE INVENTION

Paint stripping compositions are widely used industrial chemicals, and are used both in the finishing and refinishing of manufactured articles and in the clean-up of painting facilities. Significant amounts of paint-stripping compositions are used in connection with the refinishing of commercial and military aircraft, as well as the manufacture and refinishing of motor vehicles.

A threshold requirement for a good paint-stripping composition is that it efficiently and effectively removes a variety of paints without harming the underlying work piece. This requirement is particularly important in connection with the aircraft industry, since aircraft are frequently fabricated from lightweight aluminum or magnesium based alloys which are easily corroded by acidic or alkaline materials.

For a number of years, paint strippers based on methylene chloride were used because of methylene chloride's effectiveness in quickly softening and undermining most types of paints. However, more recently the use of methylene chloride has become disfavored mainly due to its toxicity to humans and the environment. In addition, there is growing concern about the release of volatile organic compounds and hazardous air pollutants, such as methylene chloride, into the environment. As a consequence, regulations have strictly curtailed the amount of volatile organic compounds and/or hazardous air pollutants released into the environment. These restrictions are particularly important in their application to paint stripping compositions which are typically employed in relatively large volumes and distributed over large exposed areas.

As a consequence, there is need for paint-stripping compositions which have a low content of volatile and/or hazardous organic compounds but which can be effectively employed in a cost effective manner. It is particularly important for any proposed paint stripper composition be able to strip paint from a variety of substrates including steel, aluminum, magnesium and alloys of the foregoing without damage to the substrate.

In answering these needs a number of paint stripping compositions are known in the art. U.S. Pat. No. 5,990,062 to Summerfield, et al. discusses a paint stripping composition comprising benzyl alcohol, methylene chloride, hydrogen peroxide and water as well as a variety of optional secondary ingredients such as thickeners, surfactants, pH control agents, accelerators, corrosion inhibitors, preservatives, coloring agents and fragrances.

U.S. Pat. No. 6,030,466 to Myers discusses a paint stripping composition comprising tetrahydrofurfuryl alkyl ether, and a solvent selected from the group comprising of n-methyl pyrrolidone, glycol ethers, glycol ether esters, carbonates and mixtures of the foregoing along with a variety of secondary additives such as formic acid, corrosion inhibitors and fragrances.

U.S. Pat. No. 5,817,612 to Distaso discusses a paint stripping formulation comprising benzyl formate and a variety of secondary ingredients such as those suggested by Summerfield, et al. U.S. Pat. No. 5,851,972, also to Distaso, discusses a paint stripping product comprising benzyl alcohol and anisole. U.S. Pat. No. 6,025,313 to Weir also discusses benzyl alcohol based paint strippers.

U.S. Pat. Nos. 5,753,603 and 6,001,192, both to Lallier, et al., discuss paint stripping compositions based upon aprotic polar solvents such as n-methyl pyrrolidone. A variety of secondary ingredients are also discussed.

In accordance with the invention described herein, an improved paint stripping composition is disclosed which meets the needs described above. In particular, the composition described herein has been found to minimize the amount of volatile organic compounds and hazardous air pollutants while effectively and cost efficiently stripping paint from a variety of substrates, including steel, aluminum, magnesium and alloys of the foregoing, without damage to the substrate.

SUMMARY OF THE INVENTION

Disclosed herein is a paint stripping composition comprising an admixture of a solvent of the following molecular structure:

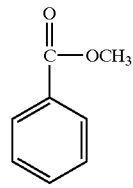

with formic acid. A variety of secondary additives such as thickeners, surfactants, corrosion inhibitors, coloring agents and fragrances may also be added. Use of the foregoing composition in a method for stripping paint is also disclosed.

DETAILED DESCRIPTION OF THE INVENTION

The present invention pertains to a paint stripping composition comprising an admixture of a solvent having the following formula:

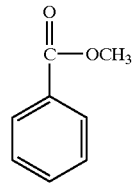

with formic acid, as well as a method for using the foregoing composition in a process for stripping paint from a variety of surfaces. The paint stripping composition of this invention may also preferably comprises thickeners, surfactants, corrosion inhibitors, coloring agents and fragrances. Most preferably, however, the paint stripping composition is substantially free of n-methyl-2-pyrrolidone. N-methyl-2-pyrrolidone is not required in this paint stripping composition, would add unnecessary cost, and would interfere with the stripping efficiency of the methyl benzoate and formic acid combination. As a result, it is recommended that the paint stripping composition of this invention be substantially free of n-methyl-2-pyrrolidone.

As noted, the paint stripping composition of this invention comprises methyl benzoate of the following structure:

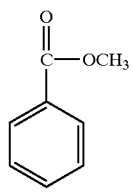

as a principal ingredient. The concentration of methyl benzoate in the paint stripping composition may range from 10 to 90 percent by weight of the paint stripping composition, but is preferably from 60 to 80 percent by weight of the composition. Methyl benzoate generally has a pleasant fragrance and therefore the paint stripping compositions of this invention can be used without odor objections and without the necessity of adding masking fragrances.

In addition to the foregoing methyl benzoate, this paint stripping composition also comprises formic acid. The concentration of formic acid in the paint stripping composition may range from 5 to 50 percent by weight of the paint stripping composition but is preferably from 15 to 30 percent by weight of the composition.

While the foregoing components provide a highly effective paint stripping composition, in many instances, auxiliary ingredients may also be used. Such auxiliary ingredients include thickeners, surfactants, corrosion inhibitors, coloring agents and fragrances.

Thickeners are widely used in paint stripping compositions primarily because they assist the stripping composition in clinging to the surfaces that are being stripped. Typical thickeners included fumed silica, various cellulose based materials such as methyl or ethyl cellulose and other known thickeners which are compatible with the ingredients of the paint stripping composition and which effectively thicken the composition and/or increase its viscosity. If thickeners are used, their concentration may range from 1 to 15 percent by weight of the paint stripping composition but will preferably be from 3 to 10 percent by weight of the composition.

Surfactants may also be used in order to improve the contact between the paint stripping composition and the surface being stripped. Non-ionic surfactants such as the Tergitol® series of surfactants available from the Union Carbide company are particularly useful. If used, the concentration of surfactant in the paint stripping composition may range from 0.5 to 5 percent by weight but is preferably from 1 to 3 percent by weight of the composition.

The paint stripping composition of this invention may also contain corrosion inhibitors for added protection of underlying metallic substrates. Such corrosion inhibitors may include triazoles, thiazoles, imidazoles, benzimidazoles and combinations of the foregoing. Preferred corrosion inhibitors include benzotriazole, tolyltriazole, mercaptobenzothiazole and other well known corrosion inhibitors. If corrosion inhibitors are employed, their concentration may range from 0.5 to 3 percent by weight of the paint stripping composition but is preferably from 1 to 2 percent by weight of the composition.

Although generally not functional, coloring agents or fragrances may be added to the paint stripping composition. As noted, since methyl benzoate has a generally pleasant fragrance, additional masking fragrances may not be necessary.

The paint stripping composition of the present invention is effective in stripping paints from a variety of substrates including steel, galvanized steel, zinc plated steel, magnesium alloys, aluminum and its alloys, and wood. This paint stripping composition has been found to be particularly useful in stripping paint from aluminum and aluminum alloys. A variety of paints are strippable with this formulation, including oil base alkyd and latex paints, varnishes, lacquers, shellacs, enamels, polyurethanes and epoxy coatings.

This paint stripping composition is generally applied at room temperature by spraying or brushing the composition onto the painted surface to be stripped. Stripping time may range from about 1 minute to 1 hour, depending upon the paint and particular surface conditions. Once the paint has appropriately lost adhesion from the substrate, the paint is removed by scraping, brushing or rinsing and then the surface is rinsed clean with an appropriate cleaner followed by water.

The present invention is further described by the following example, which should be taken as illustrative only and not limiting.

EXAMPLE

Aluminum panels were painted with an epoxy paint primer and then with a two component industrial epoxy paint which was allowed to cure. Several drops of the following paint stripping composition were applied to the painted surface:

| Component | Concentration (% by weight) |
|---|---|
| Methyl benzoate | 73.60 |
| Formic acid | 20.00 |
| Fumed silica | 5.00 |
| 2-mercaptobenzothiazole | 0.70 |
| Benzotriazole | 0.70 |

It took approximately 8 minutes for the paint to visibly bubble and lose adhesion from the substrate. No damage to the aluminum substrate was apparent.

What is claimed is:

1. A paint stripping composition comprising methyl benzoate and formic acid, wherein the paint stripping composition is substantially free of n-methyl-2-pyrrolidone, the concentration of methyl benzoate is from 10 to 99% by weight of the composition, and the concentration of formic acid is from 5 to 50% by weight of the composition.

2. A composition according to claim 1, wherein the composition also comprises at least one material selected from the group consisting of thickeners, surfactants, corrosion inhibitors, and combinations of the foregoing.

3. A composition according to claim 1, wherein the concentration of methyl benzoate in the composition is from 60 to 80 percent by weight.

4. A composition according to claim 1, wherein the concentration of formic acid in the composition is from 15 to 30 percent by weight.

5. A composition according to claim 2, wherein the corrosion inhibitors are selected from the group consisting of benzotriazole, tolytriazole, mercaptobenzothiazole, and combinations of the foregoing.

6. A method of stripping paint from a painted substrate, said method comprising contacting the painted substrate with a composition comprising methyl benzoate and formic acid, wherein the composition is substantially free of n-methyl-2-pyrrolidone, the concentration of methyl benzoate is from 10 to 90% by weight of the composition, and the concentration of formic acid is from 5 to 50% by weight of the composition.

7. A method according to claim 6, wherein the composition also comprises at least one material selected from the group consisting of thickeners, surfactants, corrosion inhibitors and combinations of the foregoing.

8. A method according to claim 6, wherein the concentration of methyl benzoate in the composition is from 60 to 80 weight percent.

9. A method according to claim 6, wherein the concentration of formic acid in the composition is from 15 to 30 percent by weight.

10. A method according to claim 7, wherein the corrosion inhibitors are selected from the group consisting of triazoles, imadazoles, thiazoles, benzotriazoles, and combinations of the foregoing.

* * * * *